US005912981A

United States Patent [19]

Hansmire et al.

[11] Patent Number: 5,912,981

[45] Date of Patent: Jun. 15, 1999

[54] BAGGAGE SECURITY SYSTEM AND USE THEREOF

[76] Inventors: Kenny Hansmire, 2309 Balsam Dr. K-210, Arlington, Tex. 76006; Anthony P. Streeter, 605 Iroquois Trail, Carol Stream, Ill. 60188

[21] Appl. No.: 08/865,421

[22] Filed: May 28, 1997

Related U.S. Application Data

[60] Provisional application No. 60/022,896, Aug. 1, 1996.

[51] Int. Cl.$^{6}$ .......... G06K 9/00

[52] U.S. Cl. .......... 382/116; 382/124

[58] Field of Search .......... 382/115, 116, 382/124; 356/71; 283/69; 427/1; 40/6; 235/380, 382, 382.5

[56] References Cited

U.S. PATENT DOCUMENTS

| | | | |
|---|---|---|---|
| 1,459,634 | 6/1923 | Miller . | |
| 1,499,995 | 7/1924 | Merritt . | |
| 1,746,955 | 2/1930 | Messer . | |
| 1,810,493 | 6/1931 | Messer . | |
| 3,318,282 | 5/1967 | Bean | 118/9 |
| 3,318,428 | 5/1967 | Klein | 194/2 |
| 3,419,287 | 12/1968 | Rudie | 283/7 |
| 3,831,552 | 8/1974 | Schmidt et al. | 118/31.5 |
| 3,897,749 | 8/1975 | May et al. | 118/31.5 |
| 4,029,012 | 6/1977 | Smith, III et al. | 101/368 |
| 4,182,261 | 1/1980 | Smith, III et al. | 118/31.5 |
| 4,379,178 | 4/1983 | Meadows et al. | 427/1 |
| 4,634,849 | 1/1987 | Klingen | 235/487 |
| 4,650,219 | 3/1987 | Sigman | 283/70 |
| 4,699,077 | 10/1987 | Meadows et al. | 118/31.5 |
| 4,702,194 | 10/1987 | Martin et al. | 118/31.5 |
| 4,705,299 | 11/1987 | Hedgcoth et al. | 283/68 |
| 4,719,119 | 1/1988 | Thompson et al. | 427/1 |
| 4,917,987 | 4/1990 | Arndt et al. | 430/139 |
| 4,983,415 | 1/1991 | Arndt et al. | 427/1 |
| 5,071,168 | 12/1991 | Shamos | 283/117 |
| 5,160,171 | 11/1992 | Gregory et al. | 283/91 |
| 5,193,855 | 3/1993 | Shamos | 283/117 |
| 5,194,289 | 3/1993 | Butland | 427/1 |
| 5,276,435 | 1/1994 | Rossides | 340/691 |
| 5,330,231 | 7/1994 | Godfrey | 283/78 |
| 5,395,444 | 3/1995 | Arndt et al. | 118/31.5 |
| 5,395,667 | 3/1995 | Ohno et al. | 428/41.3 |
| 5,454,600 | 10/1995 | Floyd | 283/78 |
| 5,462,597 | 10/1995 | Jubran | 118/31.5 |

*Primary Examiner*—Amelia Au
*Assistant Examiner*—Vikkram Bali
*Attorney, Agent, or Firm*—Roylance, Abrams, Berdo & Goodman, L.L.P.

[57] ABSTRACT

A baggage security system is disclosed for providing fingerprint identification of all persons checking luggage or cargo to be shipped on airline flights, to enable swift identification of all persons checking or carrying on board luggage or cargo. The security kit preferably includes a first document, such as a passenger ticket, a second document, such as a baggage tag label and a fingerprint coating material. The first document or passenger ticket has a first substrate with a personal information area on a surface thereof bearing the name of the person depositing baggage or cargo for transport. The ticket additionally has a fingerprint identification area on a surface thereof for receiving a fingerprint of the passenger wishing to check luggage. The second document or baggage tag label has a second substrate with at least one fingerprint receiving area bearing an inkless fingerprint developing coating for developing a visible colored image of a fingerprint of a finger of the person upon contact of the coating by his or her finger. The fingerprint developing coating is then removed from the second substrate and deposited onto the first substrate in the fingerprint identification area.

2 Claims, 3 Drawing Sheets

BAGGAGE SECURITY SYSTEM AND USE THEREOF

RELATED APPLICATION

This application claims the benefit of U.S. Provisional Application Ser. No. 60/022,896, filed Aug. 1, 1996.

FIELD OF THE INVENTION

The present invention is directed to a baggage security system to enable identification of persons checking baggage or cargo in the event of a mishap. More particularly, this invention relates to a kit involving a labeling system for identifying the person checking baggage or cargo, and to improve security on airline flights.

BACKGROUND OF THE INVENTION

Various methods have been proposed for improving security, particularly in connection with baggage and cargo to be shipped on domestic and international airline flights. Thus, everything from metal detectors to X-ray inspection of baggage and cargo to trained dog sniffing has been used in an attempt to prevent placement of explosive devices on airplanes.

When an explosive device ignites, attempts to locate the culprit involve inspection of debris from the aircraft in attempt to determine the type of device, the manufacturer and the purchaser. However, such information is often difficult and time consuming to obtain, thus giving the culprit significant time to go into hiding.

SUMMARY OF THE INVENTION

A baggage security system has now been discovered which can be used to provide the fingerprint identification of all persons checking luggage or cargo to be shipped on airline flights, thus enabling swift identification of all persons checking or carrying on board luggage or cargo. The present invention comprises a security kit for providing a fingerprint record of persons checking baggage or cargo for transportation. The kit comprises a first document, such as a passenger ticket, comprising a first substrate having a personal information area on a surface thereof bearing the name of the person depositing baggage or cargo for transport. The ticket additionally has a fingerprint identification area on a surface thereof for receiving a fingerprint of the passenger wishing to check luggage. The kit also comprises a second document, such as a baggage tag label, comprising a second substrate having at least one fingerprint receiving area bearing an inkless fingerprint developing coating for developing a visible colored image of a fingerprint of a finger of the person upon contact of the coating by his or her finger. The fingerprint developing coating is then removed from the second substrate and deposited onto the first substrate in the fingerprint identification area.

According to one embodiment of the security kit of the present invention, the surface of the second substrate in the fingerprint receiving area supports a third substrate in the form of a removable label bearing the inkless fingerprint developing coating. The label is provided with a pressure sensitive backing and can be removed from the second substrate and adhered to the fingerprint identification area of the passenger ticket.

According to another embodiment of the invention, the portion of the first substrate bearing at least one fingerprint receiving area is severable from the remainder of the baggage tag label and adherable to said fingerprint identification area of ticket form. The ticket form bearing the passenger's fingerprint is retained in a file for a predetermined period of time after the aircraft, for example, has safely arrived without mishap. The ticket form can then be destroyed, if desired.

In this manner, the fingerprint identification of the passenger along with the name on the ticket record can be made available to investigating authorities in the event of a mishap, to assist in the location of all persons checking luggage.

According to another embodiment of the present invention, a method is provided for tracking persons checking baggage or cargo which comprises obtaining from a passenger checking luggage or cargo a ticket form at a first station. The ticket form comprises a first substrate having a personal information area on a surface thereof bearing the name of the person depositing baggage or cargo for transport. The first substrate additionally has a fingerprint identification area on a surface thereof for receiving a fingerprint of the person checking luggage. A baggage tag is provided for each item of baggage or cargo, which tag comprises a substrate having at least one fingerprint receiving area bearing an inkless fingerprint developing coating for developing a visible colored image of a fingerprint of a finger of said passenger upon contact of coating by said passenger's finger.

The passenger's finger is pressed upon at least one of said fingerprint receiving areas of the baggage tag, and thereby causes development of a visible colored image of said passenger's fingerprint in the coating. The coating bearing the visible colored image of the passenger's fingerprint is then transferred to the fingerprint identification area of the ticket and permanently adhered to the surface of said ticket. In this manner a record of the passenger's fingerprint is retained with the ticket bearing the passenger's name. In addition, the security system of the present invention enables the passenger to provide his or her fingerprint identification in a relatively clean, quick manner without the time delay required for cleaning the hands of messy inks.

BRIEF DESCRIPTION OF THE DRAWINGS

Referring now to the drawings.

DETAILED DESCRIPTION OF THE INVENTION

Figure 1:
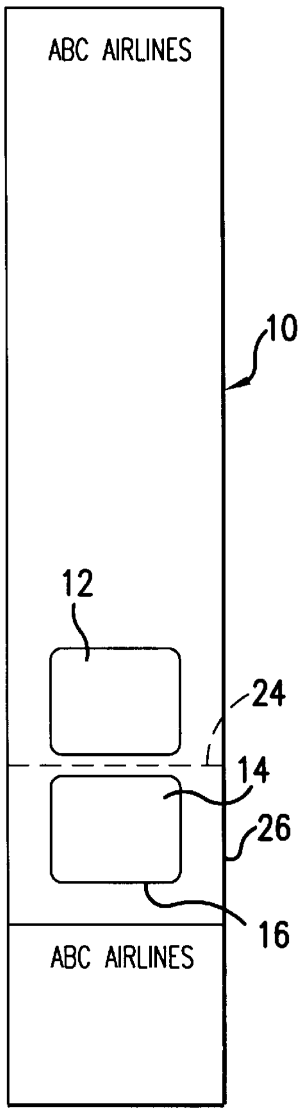
FIG. 1 is a top plan view of a baggage tag label in accordance with the present invention, prior to receiving a fingerprint.
Figure 2:
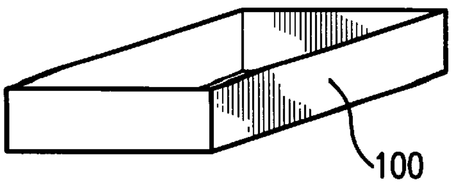
FIG. 2 is a perspective view of a pad applicator to apply a coating on a person's finger which is applied to the baggage tag label of FIG. 1.

Referring to the drawings, FIG. 1 illustrates the invention in connection with a baggage tag label 10 having areas 12 and 14 for receiving a fingerprint impression from a passenger. Areas 12 and 14 of baggage tag label 10 may be provided with any suitable system for causing the imprintation of a fingerprint onto such areas. A preferred coating is an inkless fingerprint system as described, for example, in U.S. Pat. Nos. 4,379,178 and 4,699,077 to Meadows et al., as well as U.S. Pat. No. 5,462,597 to Jubran, the disclosures of which are hereby incorporated by reference. Likewise, U.S. Pat. No. 5,454,600 to Floyd discloses use of an "inkless" fingerprint system for providing fingerprints on a personal label for locating missing children. An especially preferred "inkless" fingerprint system is available from Identaprint Texas, Inc. in which a coating is applied to a label or other document which when used with a clear, non-toxic organic gel material supplied by a stamp pad-type applicator, for example, as shown by item 100 in FIG. 2, will result in fingerprint images 20 and 22 in the coating of areas 12 and 14. For the purpose of the following description, the term "skycap" will mean a skycap, ticket agent, gate representative and/or any other airport personnel handling baggage.

Thus, when a person checking baggage arrives at a skycap station at the airport, the skycap will ask the passenger the number of bags the passenger wishes to check and the number of carry-ons that the passenger will be bringing aboard the aircraft. The skycap will then print out the appropriate number of baggage tag labels for storage, and log that amount into the computer database, i.e., "John Doe, two bags for cargo". Each passenger will be provided with a "colored" baggage tag label for each carry-on item. For security, the "color" of the carry-on tag will change each month, resulting in 12 colored tags, i.e., Red Tag—August, Blue Tag—September, etc.

The skycap will then request the passenger to place an inkless fingerprint onto areas 12 and 14 of each baggage tag label. The passenger will perform this function by placing a finger onto the pad applicator 100 of FIG. 2 to spread a coating of the clear, non-toxic gel material onto the finger and then apply the finger to areas 12 and 14, which will result in a visible, colored fingerprint image 20 and 22, respectively, in areas 12 and 14.

Figure 4:
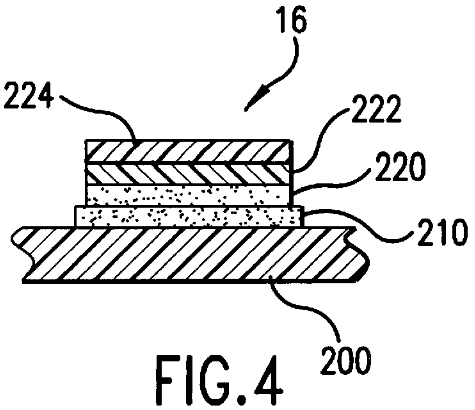
FIG. 4 is a partial cross-sectional view of the baggage tag label of FIG. 3, taken along section line 4—4.

In order to retain one of the fingerprints for possible future identification, baggage tag label 10 may be provided with perforations 24 by which the lower portion 26 of baggage tag label 10 can be removed and retained as part of a record for identification in the event of a mishap. Alternatively, or in addition thereto, area 14 can be provided with a peel-off label 16 as best seen in FIG. 4 in which tag label substrate 200 which may be paper stock or a thermal coated paper is provided with release layer 210, a permanent pressure sensitive adhesive layer 220 and a substrate 222 with a fingerprint developing coating 224 for receiving the fingerprint. In this way, area 14 of substrate 222 forming label 16 can be peeled from release layer 210 for application of label 16 with the fingerprint carrying substrate 222 to a repository for retaining a record of the fingerprint.

Figure 5:
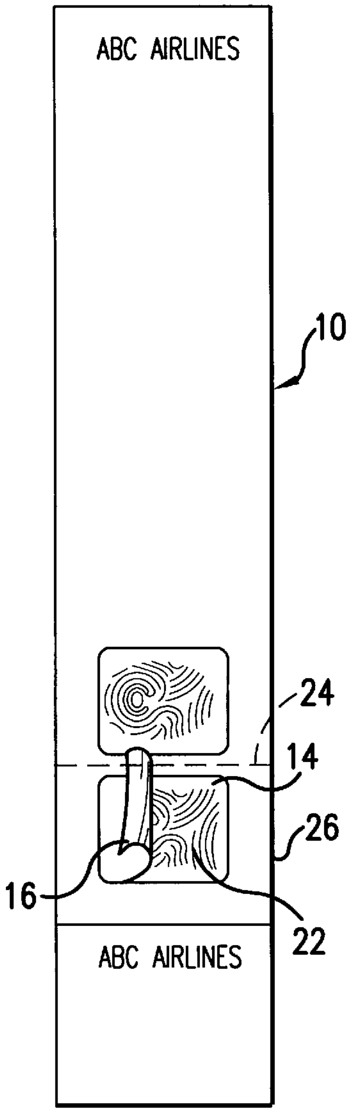
FIG. 5 is a top plan view of the baggage tag label of FIGS. 1 and 2, with the label containing the fingerprint being partially removed.

Referring now to FIG. 5, label 16 with area 14 is peeled away from tag label substrate 200, while area 12 remains with the baggage tag label 10 for application to the bag going to cargo. Preferably, label 16 bearing the fingerprint is peeled off and applied to the back of an airline ticket 300 of the person checking the luggage. The baggage tag label 10 would then be applied to the cargo checked baggage and placed on a conveyor belt entering the airport.

Figure 6:
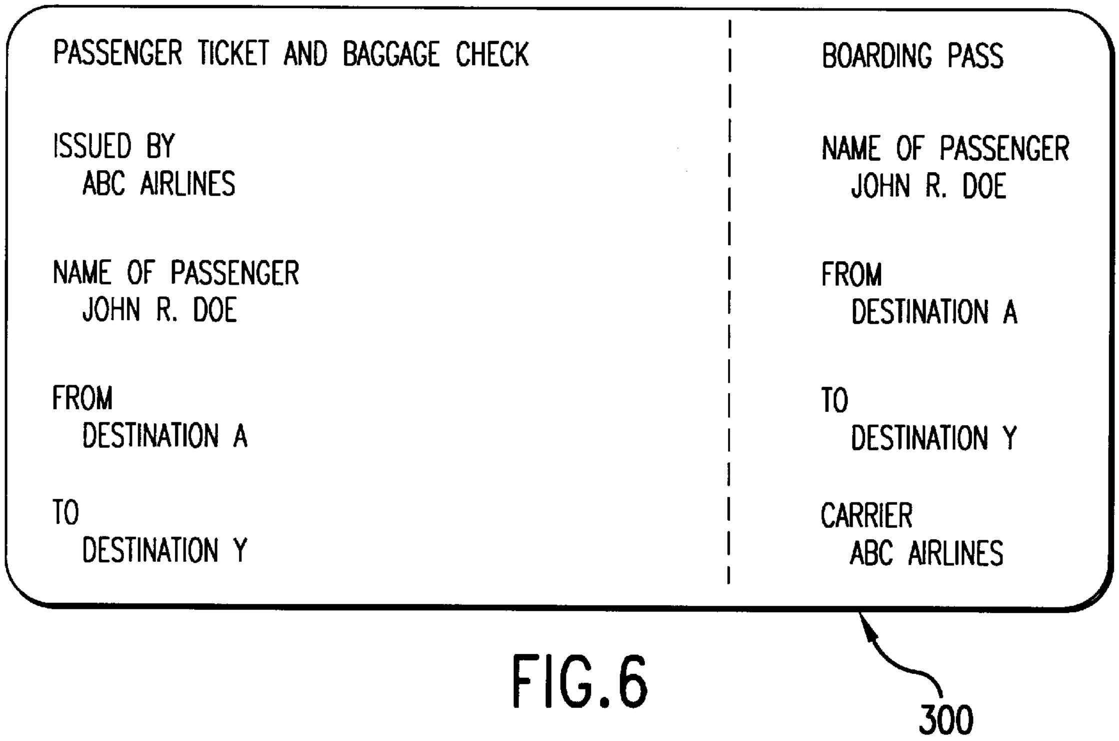
FIG. 6 is a top plan view of an airline ticket in accordance with the present invention.
Figure 7:
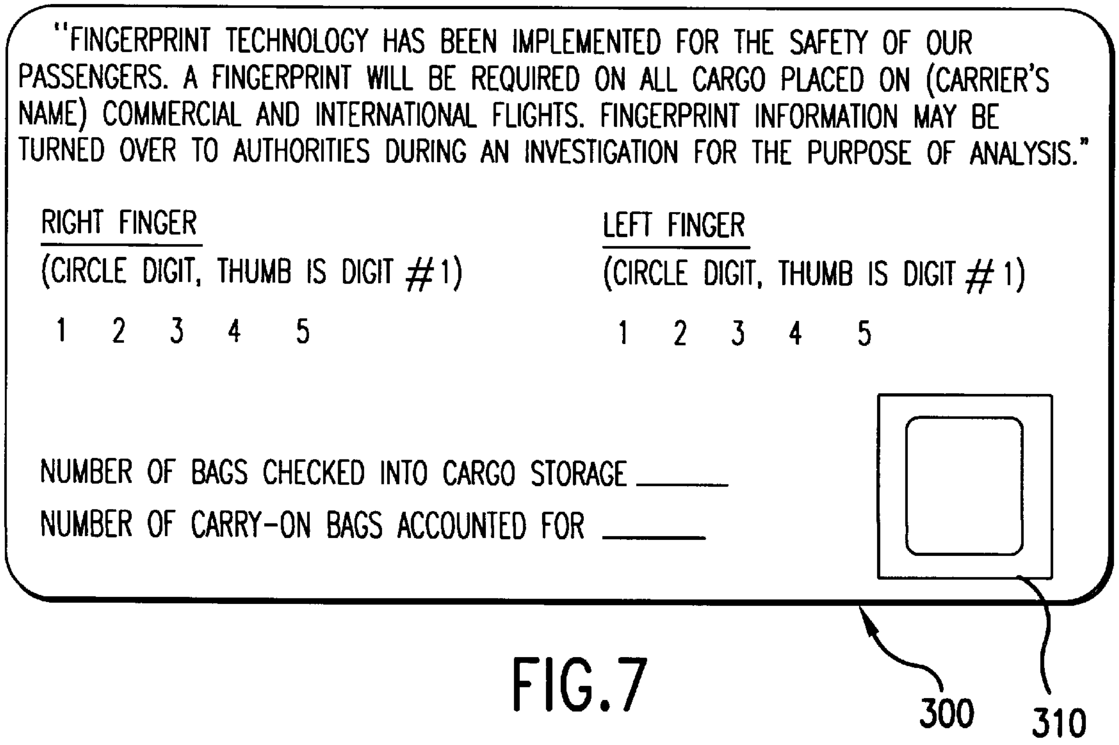
FIG. 7 is a bottom plan view of the back side of the airline ticket of FIG. 6, prior to receiving a fingerprint.

As seen in FIG. 6, the typical airline ticket 300 contains the name of the passenger and his or her destination, along with other standard information (not shown). Referring now to FIG. 7, the back of ticket 300 of the present invention is provided with information to be completed by the skycap, including the particular finger used to make the print, the number of bags checked into cargo storage, and the number of carry-on bags accounted for. Thus, if the passenger's thumb were used to form the print, digit number one would be circled as shown in FIG. 7. Next, the skycap would apply label 16 to area 310 of ticket 300 by means of the pressure sensitive backing or adhesive layer 220 on label 16. Ticket 300 containing the fingerprint on the back will then be removed from the remaining ticket carrier, the ticket stub for boarding will be perfed-off and returned to the passenger, along with the remaining return ticket, ticket receipt and ticket jacket. The skycap will then hold onto ticket 300 that contains the fingerprint label on the ticket back and provide it to the airline that he or she represents.

Figure 8:
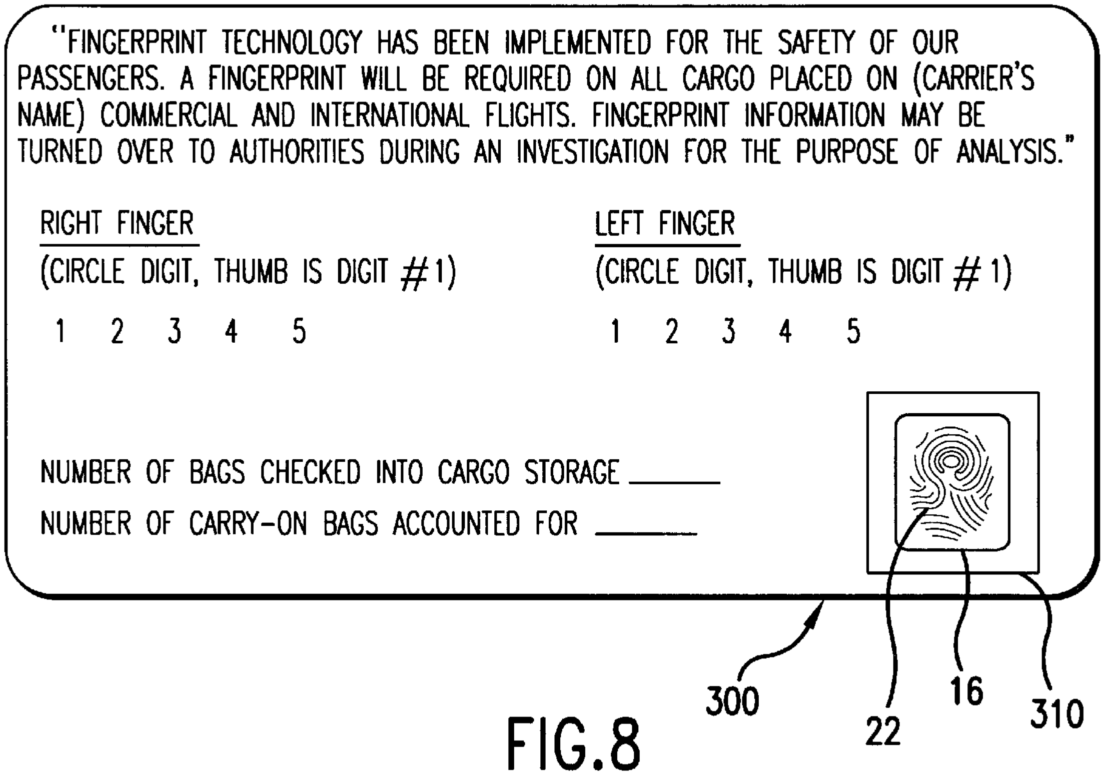
FIG. 8 is a bottom plan view of the airline ticket of FIGS. 6 and 7, after receiving the label with the fingerprint from the baggage tag label thereon.

As seen in FIG. 8, the ticket back has label 16 in area 310 for identification.

These fingerprint labels, gel pads, and colored tags would be kept in a secure area to prevent individuals from stealing the materials and using them to circumvent airline security procedures.

Figure 3:
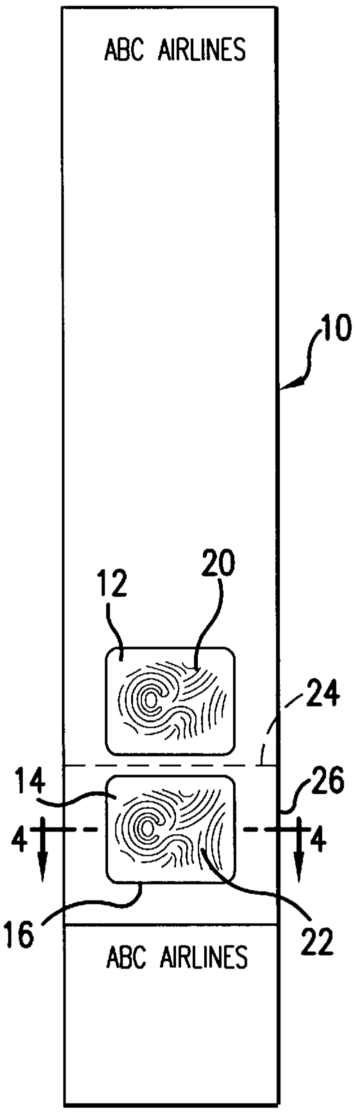
FIG. 3 is a top plan view of the baggage tag label of FIG. 1 after receiving a fingerprint impression.

Although FIGS. 1, 3 and 5 illustrate preferred means for generating fingerprint label 16, alternatively, a passenger's fingerprint can be provided to area 310 on the back of ticket 300 by any suitable means in order to provide a record of the fingerprint of the person checking the baggage or cargo. Thus, for example, a pressure sensitive label, such as label 16, can be used from a source other than the baggage label can be applied to area 310. Likewise, area 310 of ticket 300 can be provided with a coating for application of the fingerprint directly to area 310 as previously described, thus obviating the need for a label. Thus, any suitable way of providing a fingerprint for an airline passenger checking baggage to cargo in which a record of the person's fingerprint is provided can be used.

The skycap will then provide the passenger with a special baggage tag for each carry-on item. Each passenger will be provided with one "colored" baggage tag for each carry-on item. For security, the "color" of the carry-on tag will change each month, for example, resulting in twelve different colored tags, i.e., red tag—August, blue tag—September, etc. The skycap will the remind the passenger that a security baggage tag must be displayed clearly on all carry-on items. Carry-on items without a security baggage tag will not be permitted on-board the aircraft. The passenger would then leave the skycap station with their ticket stub, return ticket and flight information, their carry-on bags and security carry-on baggage tags.

If, instead, a passenger decided to go directly to the airline ticket counter to check his or her baggage, the ticket agent would follow the identical procedure outlined above for the skycap.

An airline representative would then stand at the entrance of the jet way to collect boarding pass stubs and to confirm that each piece of baggage being walked onto the plane clearly displays the appropriate colored carry-on baggage tag.

All tickets containing fingerprints on the back of the ticket will be grouped and held by the airline or airline clearing house for a period of four days, for example. If the plane reaches its destination within four days without incident, the tickets can then be discarded. If the plane experiences an explosion at any time, including preventing the plane from reaching its destination, the tickets with the fingerprints can be turned over to the proper authorities for investigation.

According to another embodiment of the present invention, the passenger is provided with a boarding card by the skycap, ticket agent or the gate representative, which displays their fingerprint on it. This card will be used as a means of linking passengers with baggage.

Figure 9:
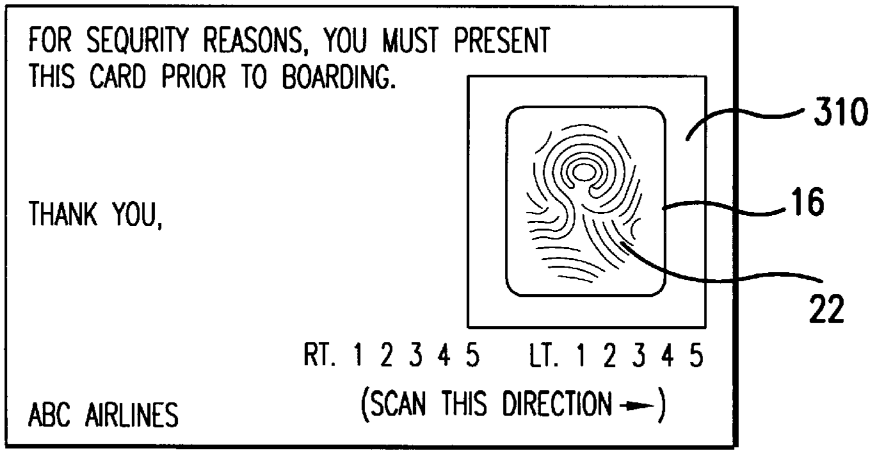
FIG. 9 is a top plan view of a boarding card after having received a label with a fingerprint from the baggage tag label.

According to this embodiment, the skycap prints out one baggage label as previously described. After the customer has provided two, clear fingerprints on two separate labels (contained in one overall baggage label), the skycap places one label on the back of the ticket as shown in FIG. 8 and the other label is applied to a boarding card as depicted, for example, in FIG. 9.

Prior to boarding the plane, an airline representative takes the passenger's card at the jet way and places it into a fingerprint scanner/reader. Such scanners are known in the art and are commercially available, for example, from Identicator Technology of San Bruno, Calif. The passenger then places the same finger that was used to make the card print of FIG. 9 into an electronic scanner. The scanner will then match the card image with the human fingerprint image.

The gate representative is linked to the baggage database and is able to query the database for information regarding any checked baggage that does not have an owner on board. Before taking the bags off of the plane, the airline would attempt to locate the missing owner inside the aircraft and at the gate area (in the event he/she forgot to present their baggage card). The airline would then has to decide whether or not to remove the unconfirmed baggage.

This embodiment of the invention which matches baggage with travelers prior to take-off assists in the prevention of airline catastrophes, while the prior embodiments involve "after the fact" procedures.

A further embodiment of the invention involves a "Shared Traveler's Database" and/or STD.

Airline tickets containing fingerprint information on the card backer is sent to a data processing company or station for entry into a main database. The fingerprints are digitally scanned into the database. Ticket information consisting of traveler's name, flight departure and arrival, flight date, airline flown and travel agency is added into the database, if desired.

Participating airlines supply this ticket information to the data processing company or station. Upon a nationwide release, fingerprint scanners would be installed at each ticket counter and gate. As individuals have their fingerprint scanned into the scanner, the scanner matches the name on the ticket to the fingerprint provided through the database. If a particular individual's print is not in the database, this information would automatically be transferred into the database and a file created.

The main database would be shared between all airlines and also would be accessible by the FBI, CIA, Interpol and other security agencies. A government security agency could continually download current travel activities of criminals by matching a provided fingerprint to criminal records electronically. In essence, when a criminal arrived at their destination, there would be a law enforcement official there to greet them. Criminals would no longer be able to hide under false names, disguises, false passports, etc.

Of course, criminals will attempt to beat the database by altering fingerprints. The system can be adapted to send up "red flags" when clear deception is apparent, i.e., a person places their finger onto the scanner and no print is registered.

While preferred embodiments have been chosen to illustrate the invention, it will be understood by those skilled in the art that various changes and modifications can be made therein without departing from the scope of the invention as defined in the appended claims.

What is claimed is:

1. A method for tracking persons checking baggage or cargo which comprises obtaining from a passenger checking luggage or cargo a ticket form at a first station, said ticket form comprising a first substrate having a personal information area on a surface thereof bearing the name of the person depositing baggage or cargo for transport;

said first substrate additionally having a fingerprint identification area on a surface thereof for receiving a fingerprint of said person;

providing said passenger with a baggage tag for each item of baggage or cargo comprising a substrate having at least one fingerprint receiving area bearing an inkless fingerprint developing coating for developing a visible colored image of a fingerprint of a finger of said passenger upon contact of said coating by said passenger's finger;

pressing a finger of said passenger upon at least one of said fingerprint receiving areas and thereby causing development of a visible colored image of said passenger's fingerprint in said coating;

transferring said coating bearing said visible colored image of said passenger's fingerprint to the fingerprint identification area of said ticket and permanently adhering said coating to the surface of said ticket; and means for removing said fingerprint developing coating from said second substrate and depositing said coating onto said first substrate in said fingerprint identification area.

2. The method of claim 1 wherein said baggage tag is applied to luggage which is placed in cargo.

* * * * *